(12) United States Patent
Chen et al.

(10) Patent No.: US 11,693,492 B2
(45) Date of Patent: Jul. 4, 2023

(54) MOUSE

(71) Applicant: ASUSTEK COMPUTER INC., Taipei (TW)

(72) Inventors: Chi-Fan Chen, Taipei (TW); Yi-Chung Chiu, Taipei (TW); Chen-Hou Lo, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 137 days.

(21) Appl. No.: 17/240,367

(22) Filed: Apr. 26, 2021

(65) Prior Publication Data

US 2021/0333895 A1  Oct. 28, 2021

(30) Foreign Application Priority Data

Apr. 28, 2020 (CN) .......................... 202010348567.3

(51) Int. Cl.
*G06F 3/0354* (2013.01)
*H01H 13/10* (2006.01)
*H01H 13/04* (2006.01)

(52) U.S. Cl.
CPC .......... *G06F 3/03543* (2013.01); *H01H 13/04* (2013.01); *H01H 13/10* (2013.01)

(58) Field of Classification Search
CPC ..... H01H 13/10; H01H 13/04; G06F 3/03543
See application file for complete search history.

(56) References Cited

U.S. PATENT DOCUMENTS

| 2013/0140165 A1* | 6/2013 | Lin | G06F 3/0202 |
| | | | 200/5 A |
| 2015/0136576 A1* | 5/2015 | Chu | H01H 13/04 |
| | | | 200/5 A |
| 2018/0240620 A1* | 8/2018 | Chen | H01H 13/14 |

FOREIGN PATENT DOCUMENTS

| CN | 205353957 U | 6/2016 |
| CN | 206411629 U | 8/2017 |
| CN | 108227962 A | 6/2018 |

OTHER PUBLICATIONS

Vishary Semiconductors, Transmissive Optical Sensor with Phototransistor Output, Jul. 2, 2009, p. 5 (Year: 2009).*

* cited by examiner

*Primary Examiner* — Hang Lin
(74) *Attorney, Agent, or Firm* — Muncy, Geissler, Olds & Lowe, P.C.

(57) ABSTRACT

A mouse is provided. The mouse includes a casing, a circuit board, a micro switch base, and a micro switch. The casing includes a button. The circuit board is disposed in the casing. The micro switch base is disposed on the circuit board, and includes a plurality of first openings and a plurality of second openings. The micro switch is fixed on the micro switch base through at least one of the first openings, and electrically connected to the circuit board through the first openings or the second openings.

7 Claims, 5 Drawing Sheets

MOUSE

CROSS-REFERENCE TO RELATED APPLICATION

This application claims the priority benefit of Chinese applications serial No. 202010348567.3, filed on Apr. 28, 2020. The entirety of the above-mentioned patent application is hereby incorporated by reference herein and made a part of specification.

BACKGROUND OF THE INVENTION

Field of the Invention

The disclosure relates to a mouse and, more particularly, to a mouse with a button.

Description of the Related Art

The micro switches currently applied to the mice include optical micro switch and mechanical micro switch. The structures of the two switches are different, and the pressing feelings generated by the above two are also different. The optical micro switch reduces contact wear and provide a longer service life. The mechanical micro switch has a relatively simple structure and provides user tactile feedback.

In addition, as the micro switches are mostly fixed inside the mice, users cannot replace or change the micro switches for enhancing service life or adjusting the buttons according to personal needs.

BRIEF SUMMARY OF THE INVENTION

The disclosure is to provide a mouse to replace or change the micro switches by users freely for enhancing service life or adjusting the buttons according to personal needs.

A mouse is provided in the disclosure. The mouse includes a casing, a circuit board, a micro switch base, and a micro switch. The casing includes a button. The circuit board is disposed in the casing. The micro switch base is disposed on the circuit board, and includes a plurality of first openings and a plurality of second openings. The micro switch is fixed on the micro switch base through at least one of the first openings, and electrically connected to the circuit board through the first openings or the second openings.

With the mouse provided by the disclosure, users can choose and change the optical micro switch or the mechanical micro switch of the mouse according to their preferences and needs. Thus the application is not restricted to the micro switches that originally equipped in the mouse.

DETAILED DESCRIPTION OF THE EMBODIMENTS

The embodiments of the present disclosure are disclosed in the following drawings, and for the sake of clarity, the details of the disclosure will be described in the following description. It should be noted that the drawings all adopt a very simplified form and all use imprecise proportions, which are only used to conveniently and clearly assist in explaining the purpose of the embodiments.

Figure 1:
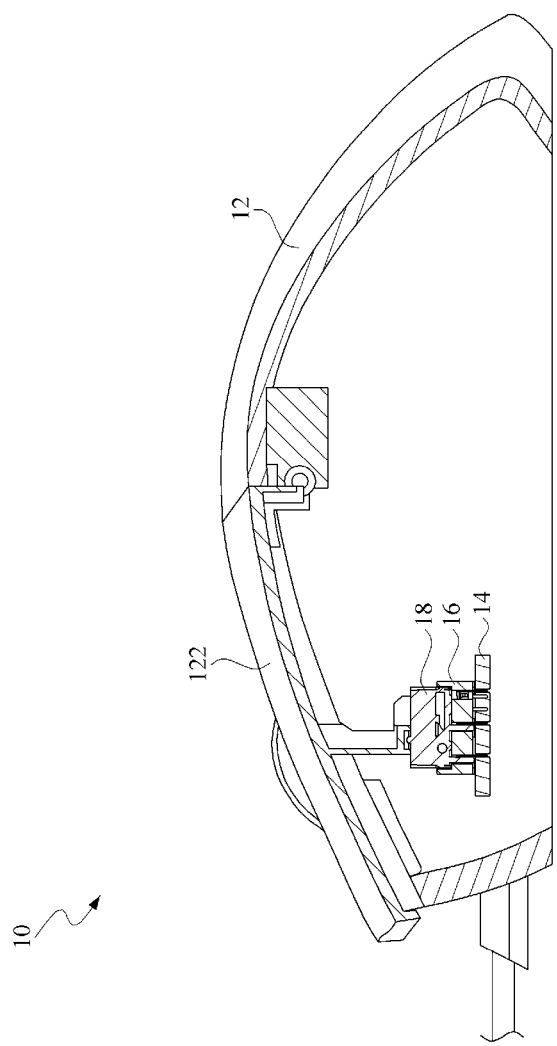
FIG. 1 is a schematic cross-sectional view of a mouse according to an embodiment.

FIG. 1 is a schematic cross-sectional view of a mouse according to an embodiment. As shown, the mouse 10 includes a casing 12, a circuit board 14, a micro switch base 16, and a micro switch 18. The casing 12 includes a button 122. The circuit board 14 is disposed in the casing 12. The micro switch base 16 is disposed on the circuit board 14.

In an embodiment, the micro switch 18 is an optical micro switch or a mechanical micro switch. The micro switch 18 is detachably disposed on the micro switch base 16. Signal output pins under the micro switch 18 are electrically connected to the circuit board 14 through the micro switch base 16.

Figure 2A:
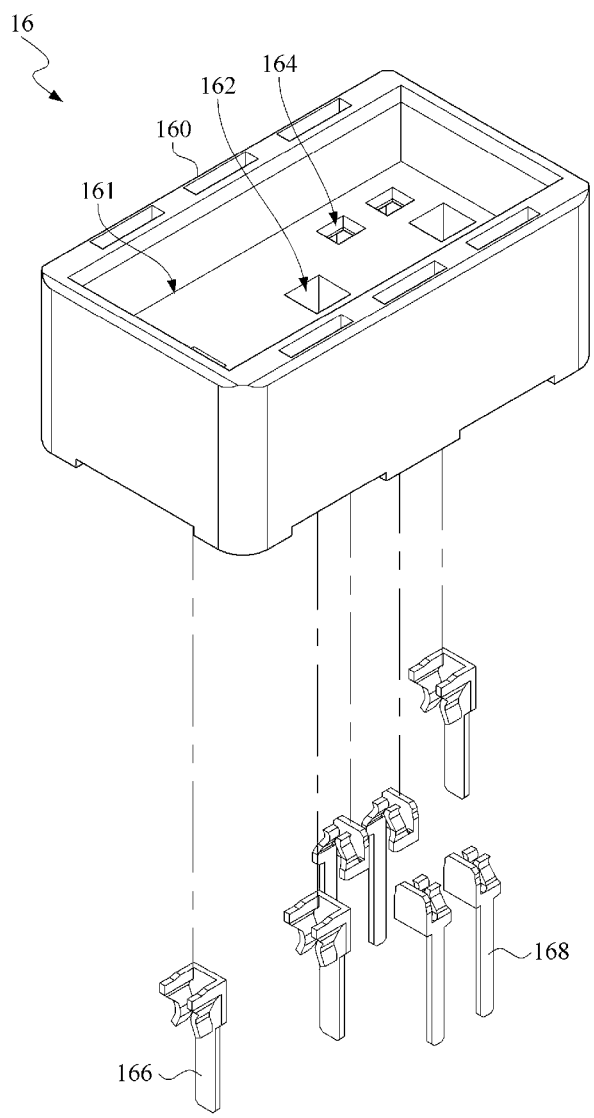
FIG. 2A is an exploded schematic diagram of a micro switch base according to an embodiment.

Pleases also refer to FIG. 2A. FIG. 2A is an exploded schematic diagram of a micro switch base 16 according to an embodiment. As shown, the micro switch base 16 includes a casing 160, a plurality of first openings 162, a plurality of second openings 164, a plurality of metal flexible plates 166, and a plurality of the metal contacts 168. The casing 160 has a groove 161 to accommodate the micro switch 18. The first openings 162 and the second openings 164 are located on the bottom surface of the groove 161.

Figure 2B:
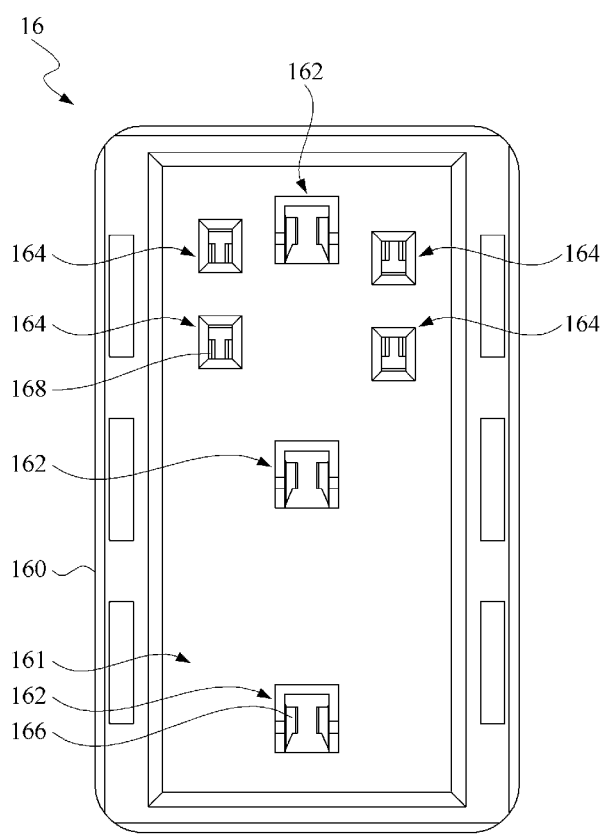
FIG. 2B is a schematic top view of the micro switch base of FIG. 2A according to an embodiment.

Pleases also refer to FIG. 2B. FIG. 2B is a schematic top view of the micro switch base 16 of FIG. 2A according to an embodiment. As shown, in an embodiment, the number of the first openings 162 is three, and the first openings 162 are evenly arranged on the bottom surface of the groove 161 along a long side of the micro switch base 16. The number of the second openings 164 is four, and the second openings 164 is symmetrically distributed on both sides of the first openings 162. In one embodiment, the size of the second openings 164 are slightly smaller than the first openings 162.

The micro switch base 16 includes a plurality of the metal flexible plates 166 and a plurality of the metal contacts 168. The metal flexible plates 166 are respectively disposed in the first openings 162. The metal contacts 168 are respectively disposed in the second openings 164.

In one embodiment, the number of the metal flexible plates 166 is the same as the number of the first openings 162, and the number of the metal contacts 168 is the same as the number of the second openings 164. In one embodiment, the metal flexible plates 166 and the metal contacts 168 have different structures. The metal contacts 168 provide the function of electrical connection to transmit the electrical signal from the micro switch 18 to the circuit board 14.

In addition to electrically connecting the pins of the micro switch 18, the metal flexible plate 166 uses the elastic restoring force of the structure of the metal flexible plate 166 (or the micro switch base 16) to provide a clamping and fixing force for the pins, which is not limited herein.

In one embodiment, both the first openings 162 and the second openings 164 of the micro switch base 16 are provided with the metal flexible plate 166 to strengthen the fixation of the micro switch base 16 to the micro switch 18. In one embodiment, instead of providing the metal contacts 168 in the first openings 162 and the second openings 164 of the micro switch base 16, a fixing structure is formed on the casing 160 of the micro switch base 16 to fix the micro switch 18.

The micro switch 18 is fixed to the micro switch base 16 through at least one of the first openings 162, and is electrically connected to the circuit board through the first openings 162 or the second openings 164. The configuration of the first openings 162 and the second openings 164 is matched with a variety of different pin configurations of the micro switch. Regarding the connection and fixing method of the micro switch 18 and the micro switch base 16, there will be more detailed instructions in the following paragraphs.

Figure 3:
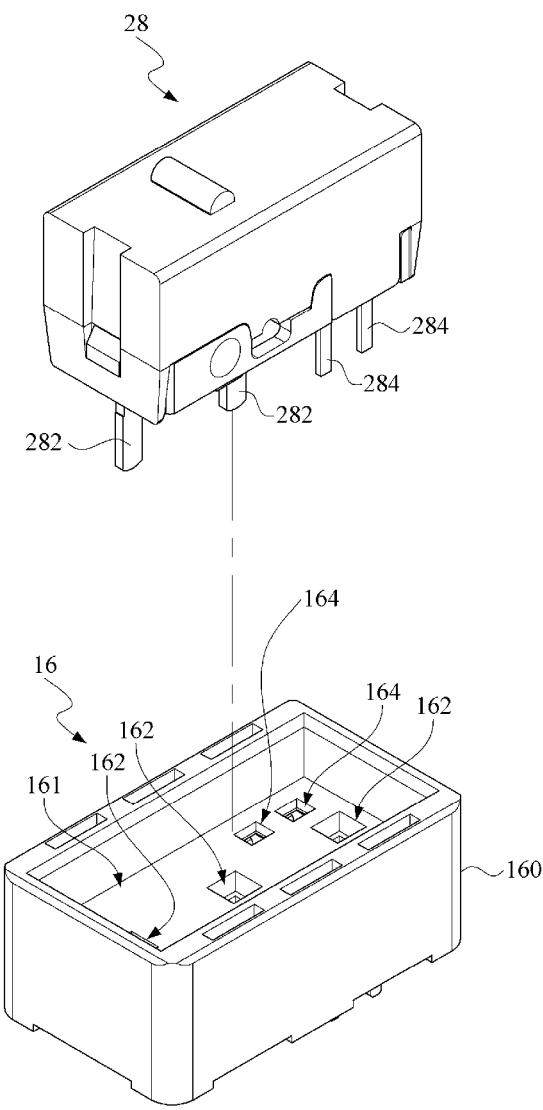
FIG. 3 is a three-dimensional schematic diagram of a micro switch base with an optical micro switch according to an embodiment.

Pleases also refer to FIG. 3. FIG. 3 is a three-dimensional schematic diagram of a micro switch base 16 with an optical micro switch 28 according to an embodiment. As shown, the optical micro switch 28 includes at least a first pin 282 (two first pins 282 are taken as an example in the figure) and a plurality of the second pins 284 (four second pins are taken as an example in the figure).

Please refer to FIG. 2B and FIG. 3 together. The two first pins 282 correspond to two of the first openings 162. In one embodiment, the two first pins 282 are respectively located at the center of the bottom surface of the optical micro switch 28 and on a side of the bottom surface away from the second pins 284. The second pins 284 correspond to four second openings 164. The metal flexible plate 166 in the first openings 162 clamps the inserted first pins 282 to fix the optical micro switch 28. The metal contacts 168 in the second openings 164 electrically contact the inserted second pins 284 to receive the electrical signal from the optical micro switch 28 and transmit it to the circuit board 14.

Figure 4:
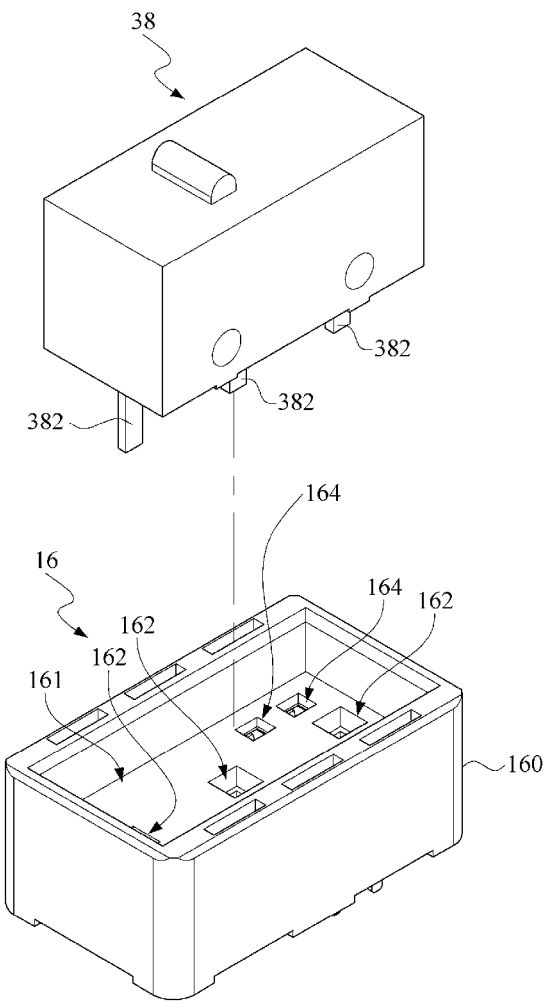
FIG. 4 is a three-dimensional schematic diagram of the micro switch base with a mechanical micro switch according to an embodiment.

Please also refer to FIG. 4. FIG. 4 is a three-dimensional schematic diagram of the micro switch base 16 with a mechanical micro switch 38 according to an embodiment. As shown, the mechanical micro switch 38 includes a plurality of first pins 382 (three first pins 382 is taken as an example in the figure). Please refer to FIG. 2B and FIG. 4 together. The first pins 382 correspond to three first openings 162 of the micro switch base 16. The metal flexible plate 166 in the first openings 162 electrically contacts the inserted first pins 382 to receive the electrical signal from the mechanical micro switch 38 and transmit it to the circuit board 14. The metal flexible plates 166 clamp the inserted first pins 382 to fix the mechanical micro switch 38.

In summary, numbers of the first openings 162 and the metal flexible plates 166 provided on the micro switch base 16 cooperate with numbers of the first pins 382 of the mechanical micro switch 38 and thus sufficiently transmit the electricity generated by the mechanical micro switch 38 to the circuit board 14.

On the other hand, corresponding to the numbers of the second pins 284 of the optical micro switch 28, the micro switch base 16 provides sufficient second openings 164 and the metal contacts 168 to transmit the electrical signal generated by the optical micro switch 28 to the circuit board 14. In this way, through the mouse 10 (especially equipped with the micro switch base 16 herein) provided, users can choose the optical micro switch or the mechanical micro switch according to their preferences and needs, and it is not restricted by the type of the micro switches that originally equipped in the mouse.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A mouse, comprising:
   a casing, comprising a button;
   a circuit board, disposed in the casing;
   a micro switch base, disposed on the circuit board, comprising a plurality of first openings and a plurality of second openings; and
   a micro switch, fixed on the micro switch base through at least one of the first openings, and electrically connected to the circuit board through the first openings or the second openings,
   wherein the micro switch is an optical micro switch or a mechanical micro switch, and
   wherein the first openings are utilized for electrically connecting the mechanical micro switch, and the second openings are utilized for electrically connecting the optical micro switch.

2. The mouse according to claim 1, wherein the first openings are evenly arranged on the micro switch base along the long side of the micro switch base.

3. The mouse according to claim 1, wherein, the second openings are symmetrically distributed on both sides of the first openings.

4. The mouse according to claim 1, wherein, the micro switch base comprises a plurality of metal flexible plates, respectively disposed in the first openings.

5. The mouse according to claim 1, wherein the micro switch base comprises a plurality of metal contacts, respectively disposed in the second openings.

6. The mouse according to claim 1, wherein, the micro switch is a mechanical micro switch, the mechanical micro switch comprises a plurality of first pins, corresponding to the first openings.

7. The mouse according to claim 1, wherein, the micro switch is an optical micro switch, the optical micro switch comprises a first pin and a plurality of second pins, the first pin corresponds to one of the first openings, and the second pins corresponds to the second openings.

* * * * *